(12) United States Patent
Nakaya et al.

(10) Patent No.: US 7,379,759 B2
(45) Date of Patent: *May 27, 2008

(54) MIMO WIRELESS COMMUNICATION SYSTEM AND WIRELESS COMMUNICATION APPARATUSES

(75) Inventors: Yuuta Nakaya, Kawasaki (JP); Takeshi Toda, Kawasaki (JP); Yasuyuki Oishi, Kawasaki (JP); Kaoru Yokoo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 22 days.

This patent is subject to a terminal disclaimer.

(21) Appl. No.: 11/354,792

(22) Filed: Feb. 15, 2006

(65) Prior Publication Data

US 2006/0131414 A1  Jun. 22, 2006

Related U.S. Application Data

(63) Continuation of application No. 10/801,426, filed on Mar. 16, 2004, now Pat. No. 7,035,672.

(30) Foreign Application Priority Data

Jul. 23, 2003  (JP) .............................. 2003-200446

(51) Int. Cl.
*H04M 1/00* (2006.01)
(52) U.S. Cl. .................. 455/562.1; 455/63.4; 455/103; 455/112
(58) Field of Classification Search ............... 455/63.4, 455/73, 108, 137, 189.1
See application file for complete search history.

(56) References Cited

U.S. PATENT DOCUMENTS 6,128,276 A * 10/2000 Agee .......................... 370/208

6,184,828 B1 * 2/2001 Shoki ......................... 342/372

(Continued)

FOREIGN PATENT DOCUMENTS

JP  2003-060604  2/2003

OTHER PUBLICATIONS

I.E. Telatar. Capacity of Multi-Antenna Gaussian Channels. Bell Labs. Technical Memorandum, 1995, pp. 1-28.
G.J. Foschini et al. On Limits of Wireless Communications in a Fading Environment when Using Multiple Antennas. Wireless Personal Commun. vol. 6, No. 3 pp. 311-335, Mar. 1998.

(Continued)

*Primary Examiner*—William Trost
*Assistant Examiner*—Jaime Holliday
(74) *Attorney, Agent, or Firm*—Katten Muchin Rosenman LLP

(57) ABSTRACT

A MIMO wireless communication system and wireless communication apparatuses are disclosed that increase the practically usable communication channel capacity in the Shannon channel capacity that determines the ratio of maximum signal transmission speed to frequency. Each wireless communication apparatus includes antenna units that transmit and receive radio frequency signals, and a weight controlling unit that provides weights with respect to the antenna units. The antenna units are formed by adaptive array antenna units that can change the directivity by varying weights with respect to antenna elements. The weight controlling unit includes an eigenvalue calculating unit that calculates the eigenvalues of a matrix HH* (H being a channel matrix), an inverse calculation unit that calculates such a channel matrix H' as to have all eigenvalues within a predetermined range that includes the average value of the calculated eigenvalues, and a directivity adjusting unit that adjusts the adaptive array antenna directivity so that the current channel matrix H approaches the calculated channel matrix H'.

15 Claims, 12 Drawing Sheets

U.S. PATENT DOCUMENTS

| | | | |
|---|---|---|---|
| 6,462,709 B1 | 10/2002 | Choi | |
| 6,593,882 B1 | 7/2003 | Kim et al. | |
| 6,765,898 B1* | 7/2004 | Bloch | 370/342 |
| 2003/0003880 A1* | 1/2003 | Ling et al. | 455/92 |
| 2003/0069047 A1* | 4/2003 | Kitahara | 455/562 |
| 2003/0181170 A1* | 9/2003 | Sim | 455/101 |
| 2004/0125036 A1* | 7/2004 | Chiang et al. | 343/757 |

OTHER PUBLICATIONS

G.J. Foschini. Layered Space-Time Architecture for Wireless Communication in a Fading Environment When Using Multi-Element Antennas. Bell Syst. Tech. J., vol. 1, No. 2 pp. 41-59, 1996.

J.B. Andersen. Array Gain and Capacity for known random channels with multiple element arrays at both ends. IEEE J. Sel. Areas in Commun., vol. 18, No. 11, pp. 2172-2178, Nov. 2000.

European Search Report dated Apr. 7, 2006.

* cited by examiner

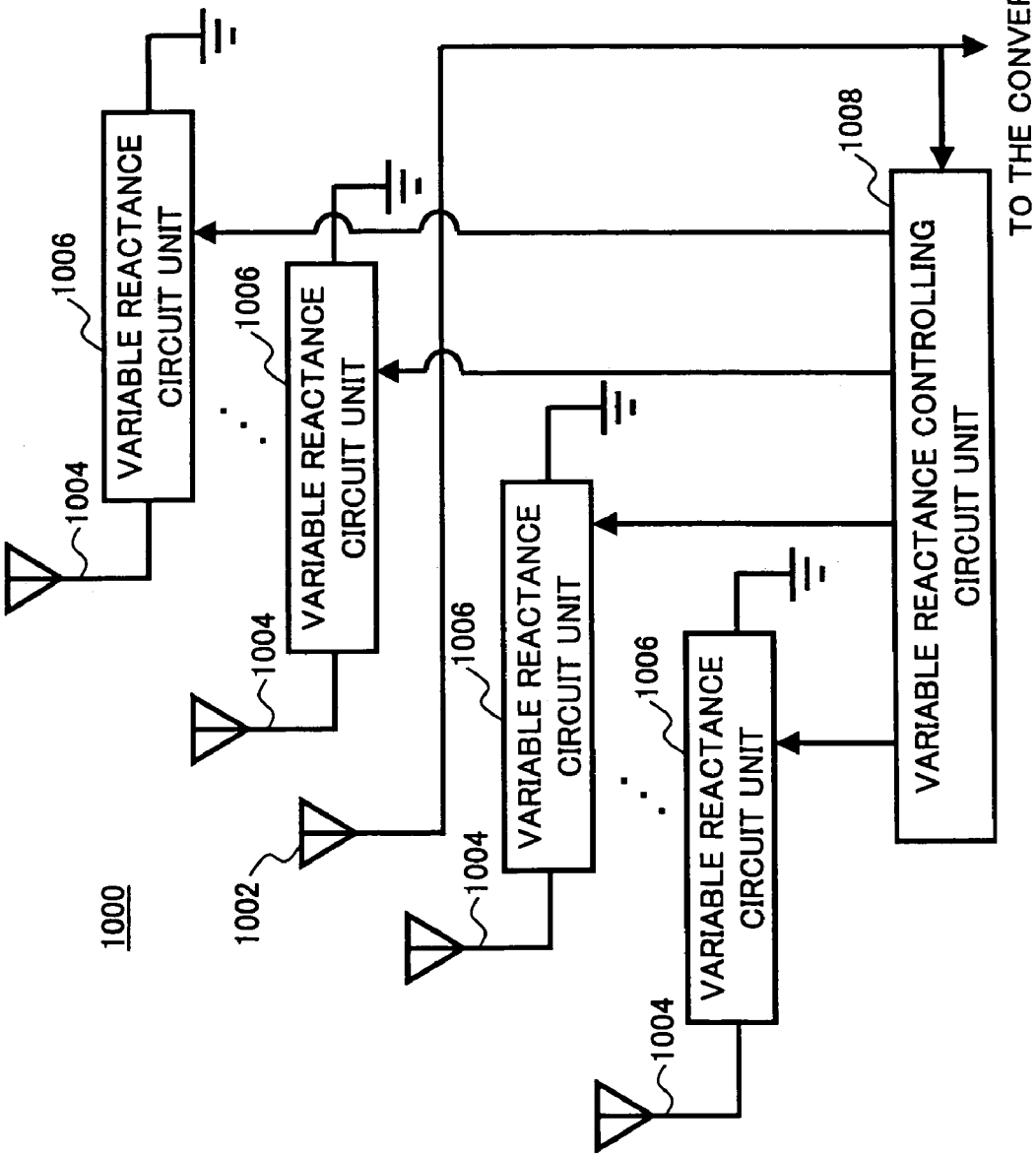

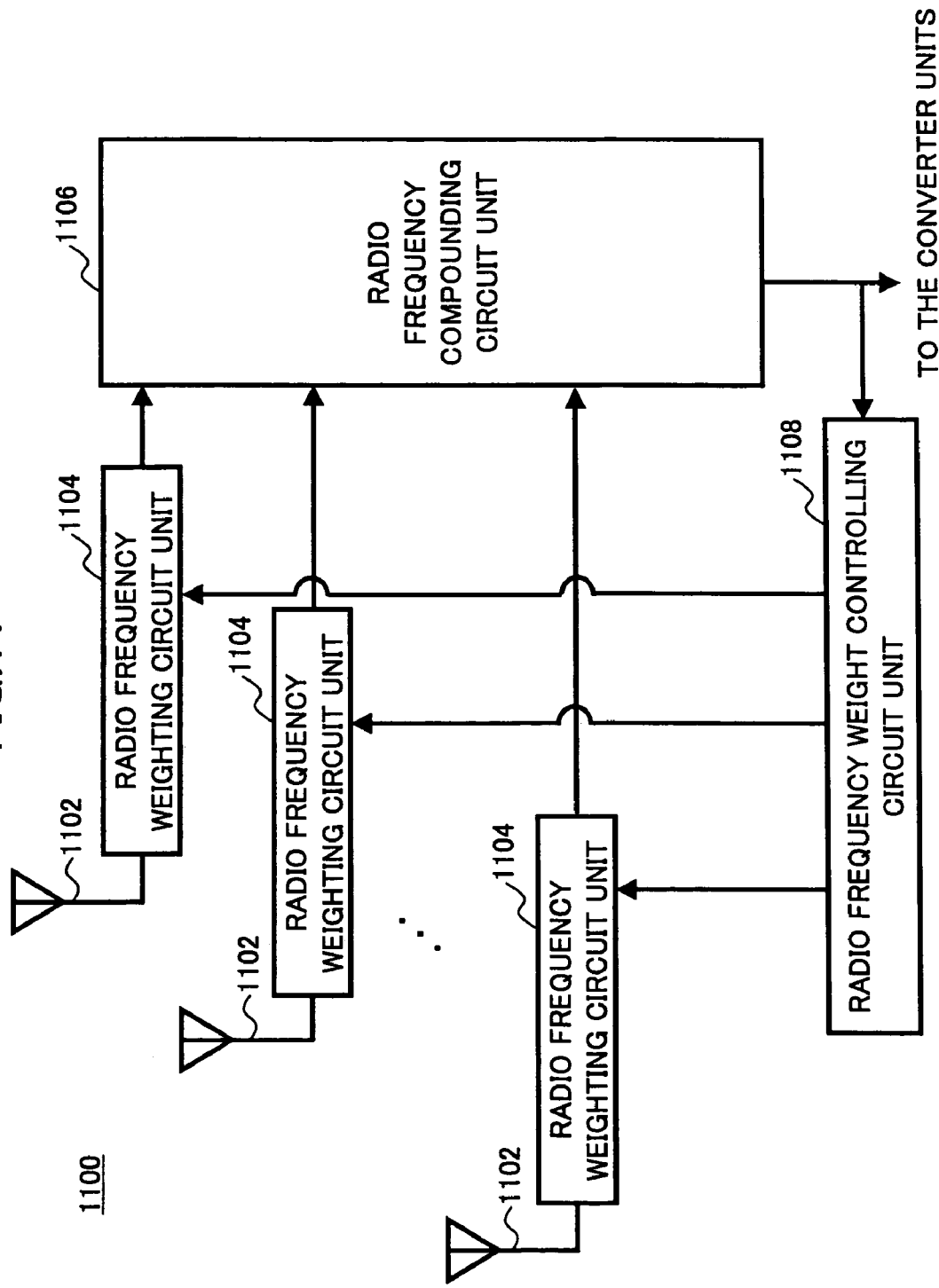

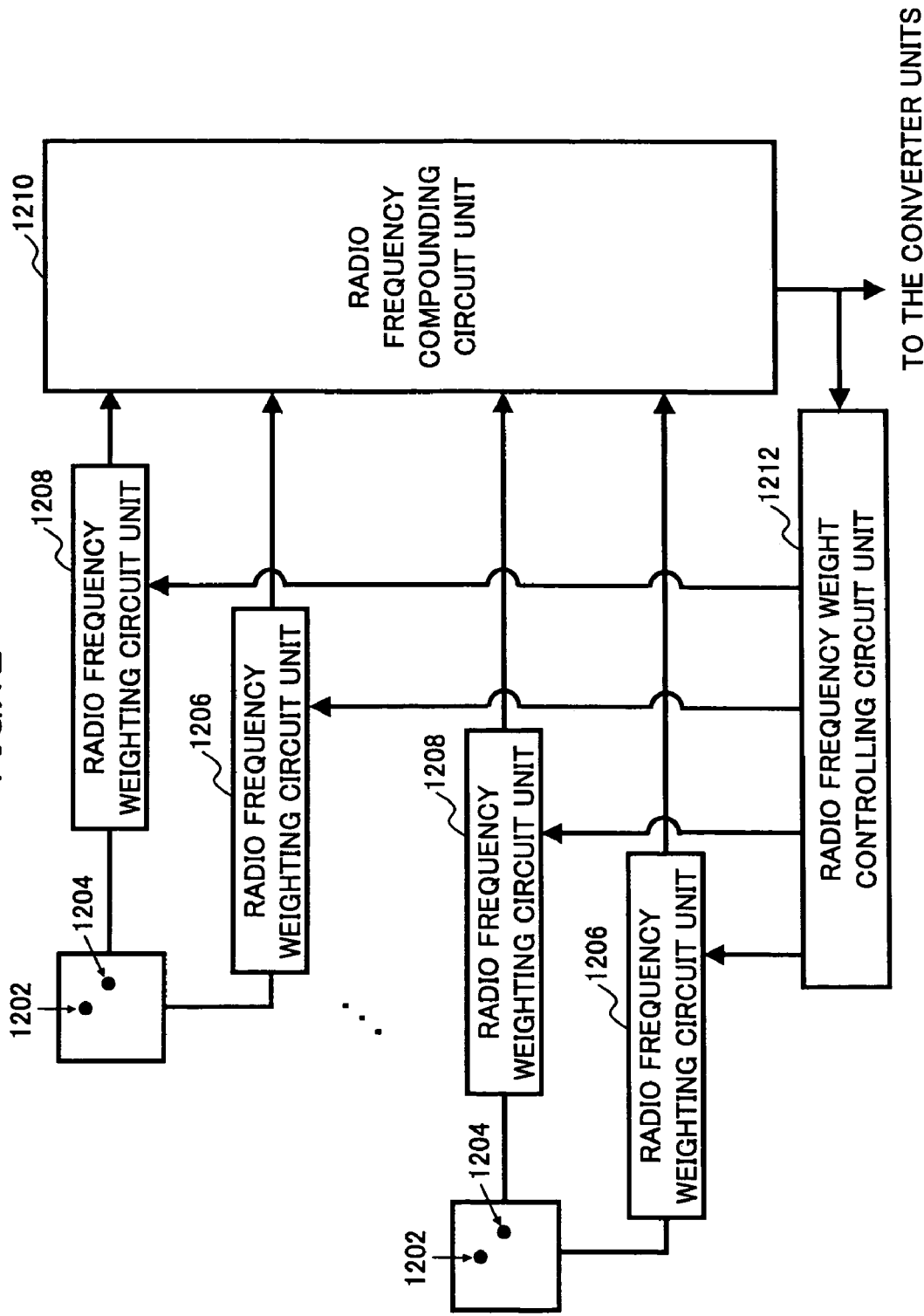

MIMO WIRELESS COMMUNICATION SYSTEM AND WIRELESS COMMUNICATION APPARATUSES

CROSS-REFERENCE TO RELATED APPLICATION

This application is a continuation of U.S. application Ser. No. 10/801,426 filed on Mar. 16, 2004 now U.S. Pat. No. 7,035,672, and claims priority from Japanese Patent Application Number 2003-200446 filed Jul. 23, 2003, the contents of which are hereby incorporated by reference.

BACKGROUND OF THE INVENTION

The present invention relates to a multiple-input-multiple-output (MIMO) wireless communication system and wireless communication apparatuses that are used in the MIMO wireless communication system.

In this field of technology, intensive studies are being made on wireless interfaces to improve communication capacities, communication speed, communication quality, resource utilizing rates, and the like. Particularly, in MIMO systems that have been attracting public attention recently, two or more antennas are provided at both the transmission end and the reception end, so that a multiple-input-multiple-output system is formed with wireless transmission channels. With a larger number of antennas for transmission and reception, the usability of space is increased, and the transmission capacity can also be increased.

FIG. 1 is a conceptual view of a MIMO communication system. For ease of explanation, the left side in FIG. 1 is the transmission end, and the right side is the reception end, though each end normally has both transmitting and receiving functions. A transmission signal vector $x(t)=(x_1(t), x_2(t), \ldots, x_M(t))^T$ is transmitted through each of M antennas at the transmission end. Here, T represents "transpose", and M is an integer of 2 or greater. It is possible to add an adjustable weight μj to each of the M antennas. Here, j is an integer between 1 and M. Likewise, N antennas are provided at the reception end. Based on the signal received at each antenna, a reception signal vector $y(t)=(y_1(t), y_2(t), \ldots, y_N(t))$ is obtained. Here, N is an integer of 2 or greater, and may be either the same as M or different from M. It is also possible to add an adjustable weight $v_i$ to each of the N antennas at the reception end. Here, i is an integer between 1 and N.

In this case, the relationship between the transmission vector x(t) and the reception vector y(t) is expressed by the following equation:

$$y(t) = \sqrt{\frac{\rho}{M}} Hx(t) + n(t) \qquad (1)$$

where H is a channel matrix that represents the transmission characteristics of the wireless transmission channels among the antennas, and the matrix elements $h_{ij}$ represent the transmission characteristics (in a baseband representation) of the wireless transmission channel between the jth antenna of the transmission end and the ith antenna of the reception end. Here, i is an integer between 1 and N, and j is an integer between 1 and M. Accordingly, the channel matrix H is a matrix having N rows and M columns (N by M). Further, ρ represents the transmission power, and n(t) represents the noise vector that is introduced in the wireless transmission channels and is assumed to be expressed by an additive Gaussian noise vector. The noise components at any time can be evaluated from random numbers in accordance with a Gaussian distribution.

If knowledge of the channel matrix H is acquired by the reception end, the communication channel capacity (or the Shannon capacity) expressed as a ratio of (maximum) signal transmission speed to frequency (bps/Hz) can be evaluated by the following expression (2) with the expected value of the amount I of conditional mutual information as to the transmission vector x(t) and the reception vector y(t).

$$E[I(x; y|H)] \leq E\left[\log det\left(I_N + \frac{\rho}{M} HH^*\right)\right] \qquad (2)$$

where: H represents the ergodicity obtained by evaluating the ensemble mean value using the time mean value; $E[\cdot]$ indicates that the term is the expected value; $I_N$ represents the unit matrix having a dimension N; [*] indicates that the term is a transposed conjugate; and det $(\cdot)$ represents a determinant of the matrix.

Further, if the knowledge of the channel matrix H is shared between the reception end and the transmission end, the communication channel capacity C can be expressed by the following equation (3):

$$C = \sum_{i=1}^{\alpha} \log_2\left[1 + \frac{\rho}{M}\lambda_i\right] \qquad (3)$$

where α and $\lambda_i$ represent the number of ranks of the matrix expressed by HH* and the ith eigenvalue, respectively. Here, i is an integer between 1 and α.

MIMO wireless communication systems and the communication channel capacities are disclosed in the following Non-Patent Documents 1 through 4.

(Non-Patent Document 1)
I. E. Telatar, "Capacity of Multi-Antenna Gaussian Channels", Bell Labs. Technical Memorandum, 1995 (See also "Europ. Trans. Telecommun."), Vol. 10, No. 6, pp. 585-595, November-December 1999)

(Non-Patent Document 2)
G. J. Foschini and M. Gans, "On the Limits of Wireless Communication in a Fading Environment When Using Multiple Antennas", Wireless Personal Commun., Vol. 6, No. 3, pp. 311-335, March 1998

(Non-Patent Document 3)
G. J. Foschini, "Layered Space-Time Architecture for Wireless Communication in a Fading Environment When Using Multiple Antennas", Bell Syst. Tech. J., Vol. 1, No. 2, pp. 41-59, 1996

(Non-Patent Document 4)
J. B. Andersen, "Array Gain and Capacity for Known Random Channels with Multiple Element Arrays at Both Ends", IEEE J. Sel. Areas in Commun., Vol. 18, No. 11, pp. 2172-2178, November 2000

In accordance with equation (3), the entire communication channel capacity C can be determined by the sum of the channel capacities $C_i$ of communication channels that correspond to the eigenvalues $\lambda_i$ of the matrix HH*. In that case, as the communication channel capacities $C_i$ are proportional to the eigenvalues $\lambda_i$, the channel capacity of a communication channel corresponding to a small eigenvalue is small, and such a communication channel has a poor throughput and a high bit error rate. Accordingly, with a very small eigenvalue, it is difficult to use the channel capacity of the communication channel corresponding to the eigenvalue in actual wireless communications, and only a part of the entire communication channel capacity C can be used.

SUMMARY OF THE INVENTION

A general object of the present invention is to provide MIMO wireless communication systems and MIMO wireless communication apparatuses in which the above disadvantages are eliminated.

A more specific object of the present invention is to provide a MIMO wireless communication system that increases practical communication channel capacities among the Shannon channel capacities that determine the ratio of maximum signal transmission speed to frequency, and wireless communication apparatuses that are employed in the MIMO wireless communication system.

The above objects of the present invention are achieved by a wireless communication apparatus that is employed in a multiple-input-multiple-output wireless communication system, and includes: a plurality of antenna units that transmit or receive radio frequency signals; and a weight controlling unit that gives a weight with respect to each of the antenna units.

In this wireless communication apparatus, at least one of the antenna units is formed by an adaptive array antenna unit that has a plurality of antenna elements, and directivity can be changed by varying the weights with respect to the antenna elements.

The weight controlling unit includes:

an eigenvalue calculating unit that calculates the eigenvalues of a matrix represented by the product of a current channel matrix representing the transmission characteristics of the wireless transmission channels of the respective antenna units and a conjugate transposed matrix of the current channel matrix;

an inverse calculation unit that calculates such a channel matrix as to have all eigenvalues within a predetermined range that includes the average value of the calculated eigenvalues but does not include the smallest one of the calculated eigenvalues; and a directivity adjusting unit that adjusts the directivity of the adaptive array antenna unit, so that the current channel matrix approaches to the channel matrix calculated by the inverse calculation unit.

The above and other objects and features of the present invention will become more apparent from the following description taken in conjunction with the accompanying drawings.

BRIEF DESCRIPTION OF THE DRAWINGS

FIG. 10 is a schematic diagram illustrating an adaptive array antenna that can be employed as an antenna unit of the wireless communication apparatuses shown in FIG. 8;

FIG. 11 is a schematic diagram illustrating another adaptive array antenna that can be employed as an antenna unit of the wireless communication apparatuses shown in FIG. 8; and FIG. 12 is a schematic diagram illustrating yet another adaptive array antenna that can be employed as an antenna unit of the wireless communication apparatuses shown in FIG. 8.

DESCRIPTION OF THE PREFERRED EMBODIMENTS

In the following, the principles of the present invention are described, with reference to the results of various simulation tests.

Figure 1:
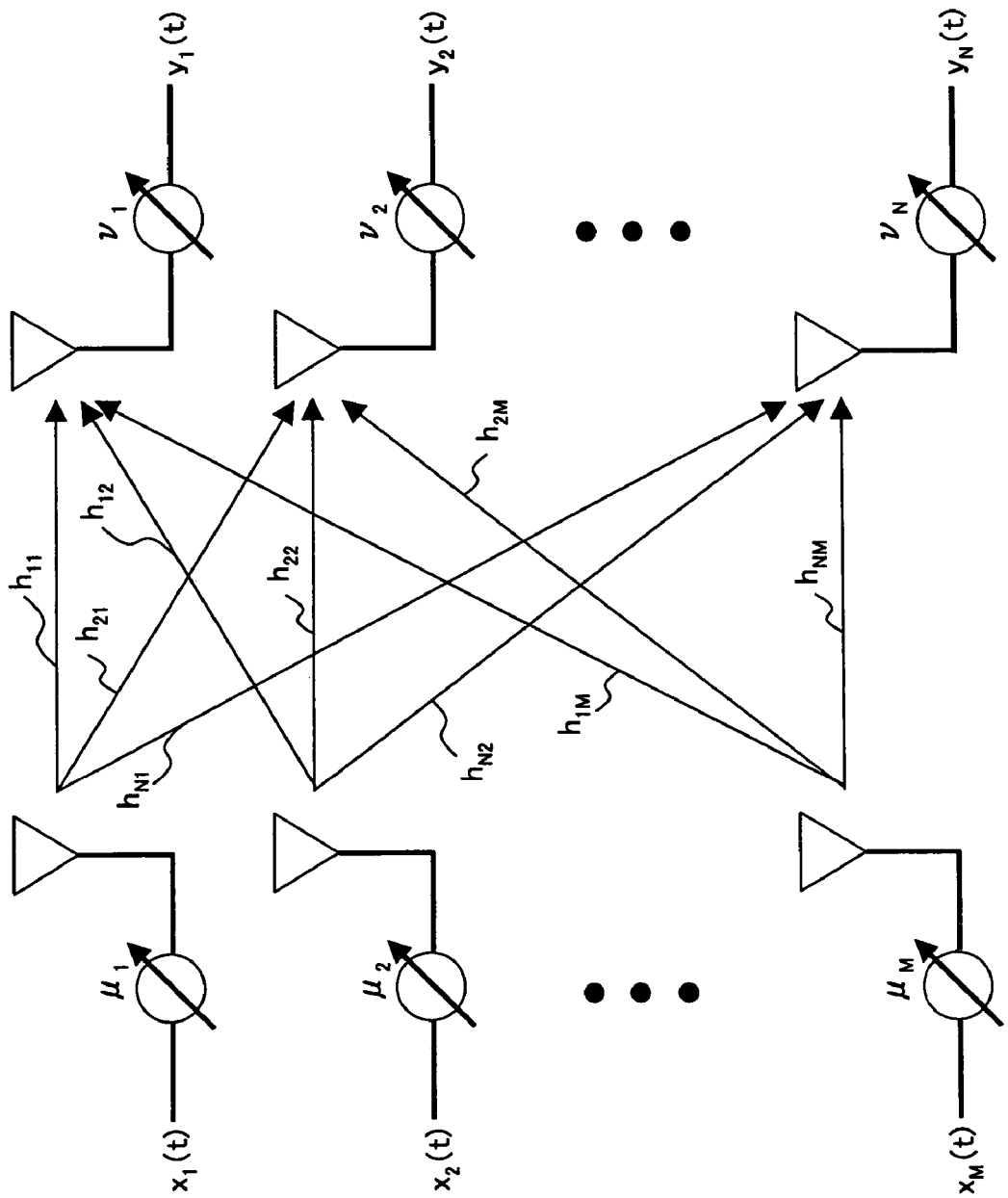
FIG. 1 is a conceptual diagram of a MIMO communication system.
Figure 2:
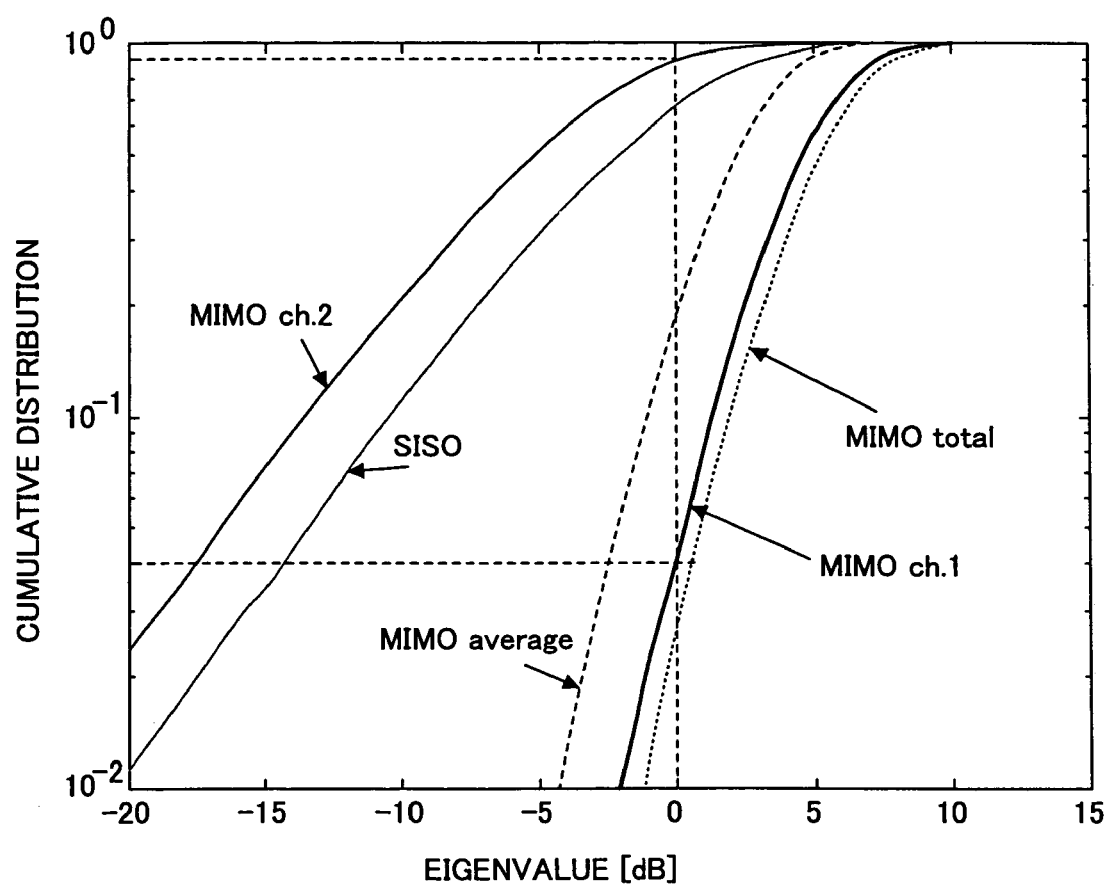
FIG. 2 is a graph of the results of a simulation test conducted to examine the cumulative distributions of eigenvalues in a case of M=N=2.

FIG. 2 shows the results of a simulation test conducted to examine the variation of the eigenvalues of a matrix HH*. In FIG. 2, the ordinate axis indicates the cumulative distribution, and the abscissa axis indicates the sizes of the eigenvalues. In this simulation test, the following conditions and procedures were employed.

1) The matrix elements $h_{ij}$ of a channel matrix H are determined by generating random numbers in accordance with a complex Gaussian distribution having an average value of 0 and a standard deviation of 1 (CN (0, 1)).

2) Based on the determined channel matrix H, eigenvalues $\lambda_1$ and $\lambda_2$ of HH* are determined. Since M and N are both 2, HH* is a 2 by 2 matrix. If the number of ranks is 2, the two eigenvalues $\lambda_1$ and $\lambda_2$ ($\lambda_1 \square \lambda_2$) are obtained.

3) The procedures 1) and 2) are repeated many times, so as to obtain a number of eigenvalues $\lambda_1^{(j)}$ and $\lambda_2^{(j)}$ (j representing the number of the repeating times).

4) A curve MIMOch1 is obtained by examining the distribution and the cumulative distribution of the larger eigenvalue $\lambda_1$, and a curve MIMOch2 is obtained by examining the distribution and the cumulative distribution of the smaller eigenvalue $\lambda_2$. Further, a curve $MIMO_{average}$ is obtained by examining the distribution of and the cumulative distribution of the average value $\lambda_{ave}$ of the eigenvalues $\lambda_1$ and $\lambda_2$, and a curve $MIMO_{total}$ is obtained by examining the distribution and the cumulative distribution of the total value $\lambda_{total}$ of the eigenvalues $\lambda_1$ and $\lambda_2$. For comparison purposes, a curve SISO that represents values $(h_{11}^2)$ obtained with a single-input-single-output (SISO) wireless communication system is also shown.

In FIG. 2, the curve MIMOch2 that represents the cumulative distribution of the smaller eigenvalue $\lambda_2$ is located on the left side, and the curve MIMOch1 that represents the cumulative distribution of the larger eigenvalue $\lambda_1$ is located on the right side in accordance with the relationship between the eigenvalues. As for the smaller eigenvalue $\lambda_2$, 90 percent of the distribution is 0 dB or below. As for the larger eigenvalue $\lambda_1$, on the other hand, only several percent of the distribution is 0 dB or below.

Figure 3:
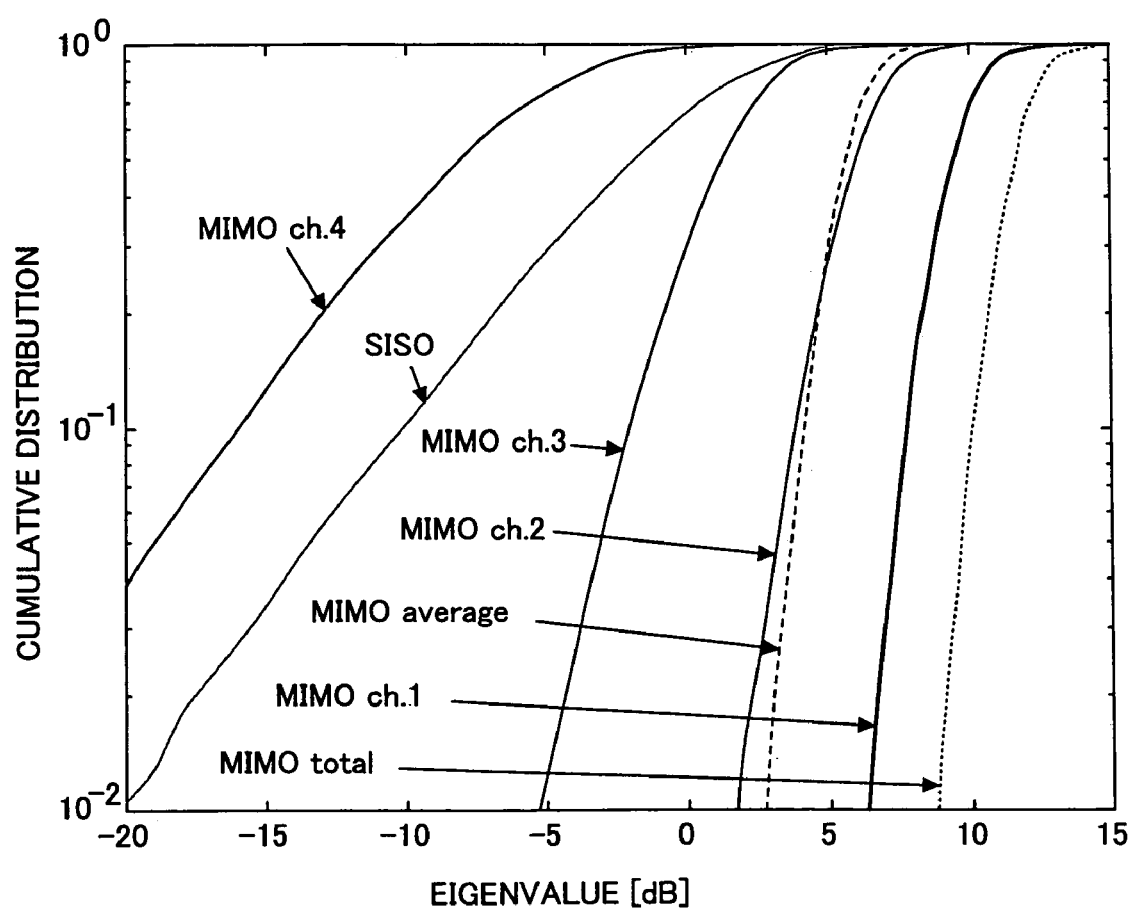
FIG. 3 is a graph of the results of a simulation test conducted to examine the cumulative distributions of eigenvalues in a case of M=N=4.

FIG. 3 shows the results of a simulation test that is different from the simulation test of FIG. 2 in that both M and N are 4. More specifically, the distributions and the cumulative distributions of four eigenvalues $\lambda_1$, $\lambda_2$, $\lambda_3$, and $\lambda_4$ ($\lambda_1 \square \lambda_2 \square \lambda_3 \square \lambda_4$) are examined to obtain curves MIMOch1 through MIMOch4. Further, the distributions and the cumulative distributions of the average value of the eigenvalues and the total value of the eigenvalues are examined to obtain a curve MIMO$_{average}$ and a curve MIMO$_{total}$. For comparison purposes, a curve obtained with a SISO system is also shown. As can be seen from FIG. 3, the cumulative distribution curves are arranged in accordance with the relationship among the eigenvalues $\lambda_1$, $\lambda_2$, $\lambda_3$, and $\lambda_4$.

Figure 4:
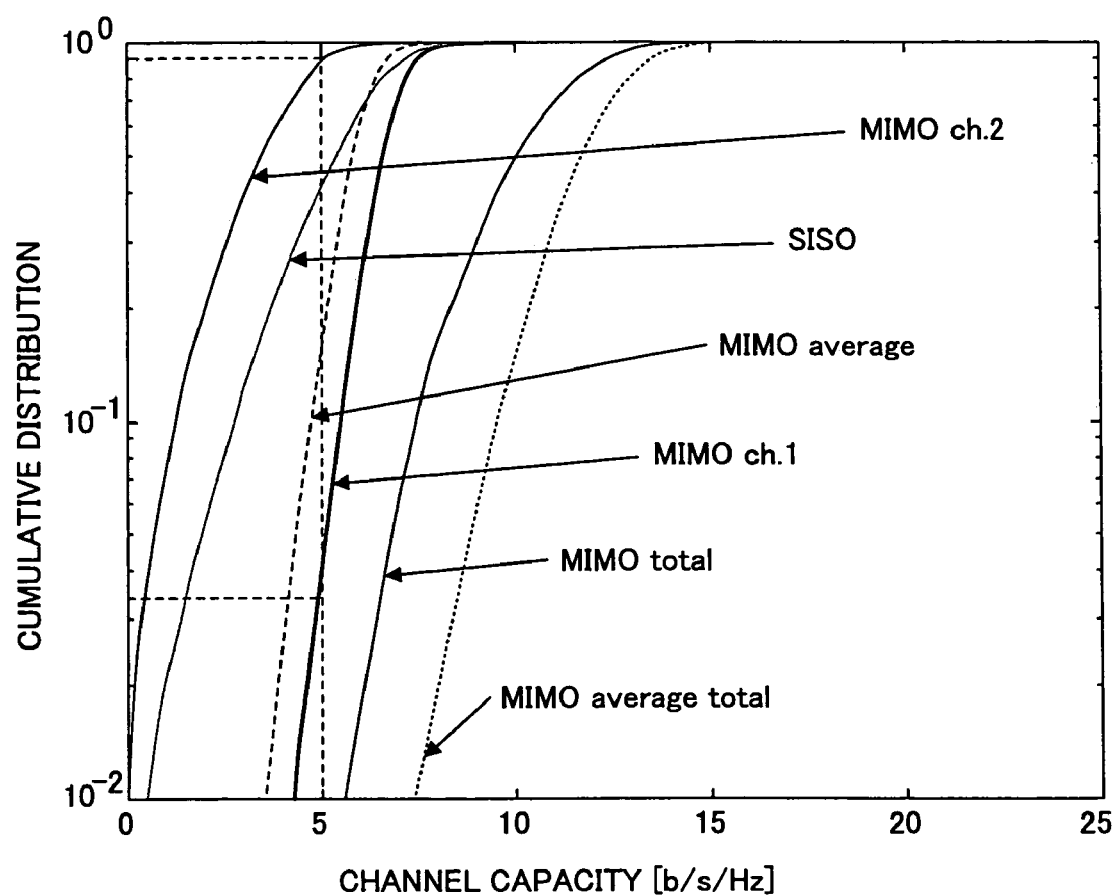
FIG. 4 is a graph of the results of a simulation test conducted to examine the cumulative distributions of communication channel capacities in a case of M=N=2.

FIG. 4 shows the results of a simulation test that was conducted by examining the cumulative distribution of communication channel capacities based on the eigenvalues obtained through the above procedures 1) through 3). In this simulation test, the signal-to-noise ratio (SNR) is assumed to be 18 dB. A curve MIMOch1 is obtained by examining the distribution and the cumulative distribution of the communication channel capacity based on the larger eigenvalue $\lambda_1$, and a curve MIMOch2 is obtained by examining the distribution and the cumulative distribution of the communication channel capacity based on the smaller eigenvalue $\lambda_2$. A curve MIMO$_{average}$ is obtained by examining the distribution and the cumulative distribution of the communication channel capacity based on the average value $\lambda_{ave}$ of the eigenvalues $\lambda_1$ and $\lambda_2$, and a curve MIMO$_{total}$ is obtained by examining the distribution and the cumulative distribution of the communication channel capacity with respect to the total value $\lambda_{total}$ of the eigenvalues $\lambda_1$ and $\lambda_2$. Also, a curve MIMO$_{average\ total}$ is obtained by doubling the channel capacity based on the average value $\lambda_{ave}$. Further, a curve SISO that represents the communication channel capacity of a signal-input-single-output (SISO) wireless communication system is also shown for comparison purposes.

As described above, the eigenvalues are proportional to the communication channel capacities. Accordingly, the curve MIMOch2 that represents the communication channel capacity calculated from the smaller eigenvalue $\lambda_2$ is shown on the left side, and the curve MIMOch1 that represents the communication channel capacity based on the larger eigenvalue $\lambda_1$ is shown on the right side, which are the same as the simulation results shown in FIG. 2. More specifically, as for the smaller eigenvalue $\lambda_2$, about 90 percent of the channel capacity distribution is 5 bps/Hz or below. As for the larger eigenvalue $\lambda_1$, on the other hand, only several percent of the channel capacity distribution is 5 bps/Hz or below. Further, the communication channel capacity with respect to the smaller eigenvalue $\lambda_2$ is smaller than that of the SISO system. Also, the total communication channel capacity MIMO$_{average\ total}$ based on the average value $\lambda_{ave}$ provides a larger communication channel capacity than the total communication channel capacity MIMO$_{total}$ based on the eigenvalues $\lambda_i$.

Figure 5:
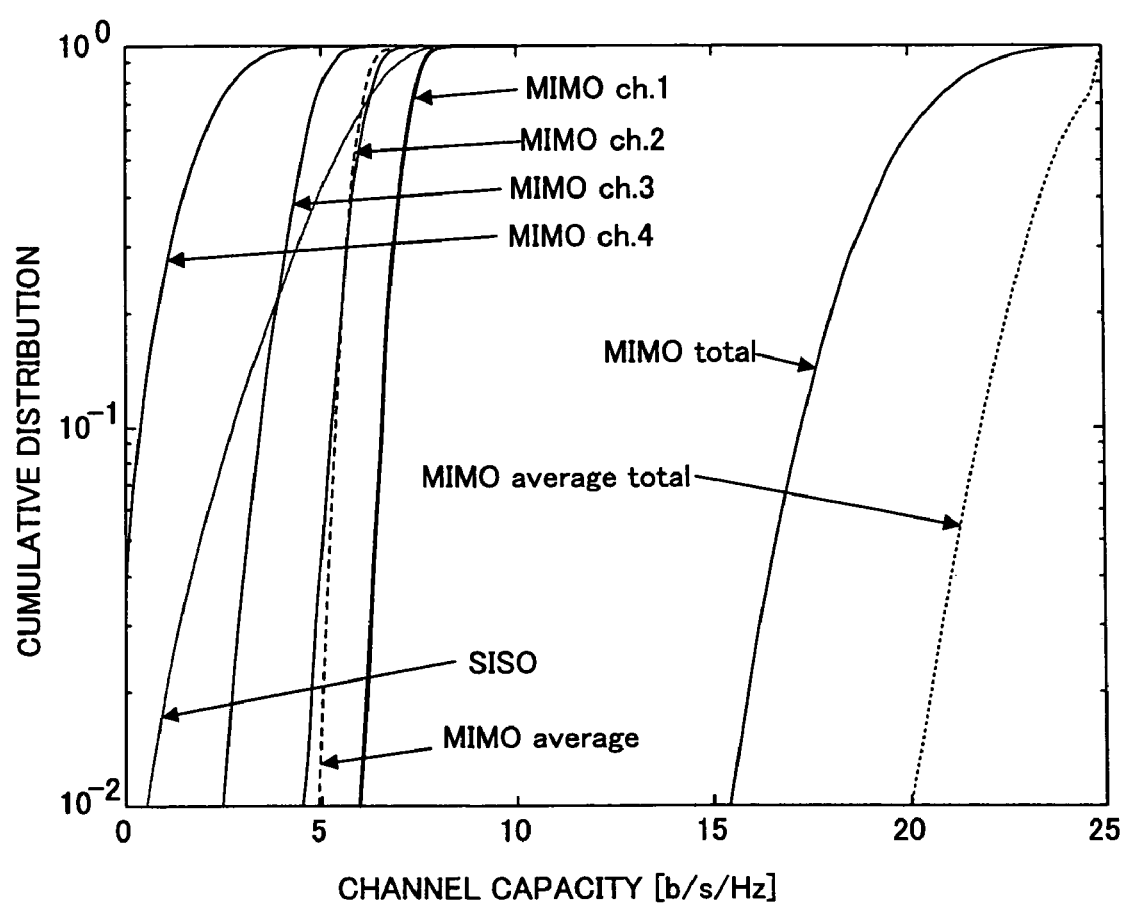
FIG. 5 is a graph of the results of a simulation test conducted to examine the cumulative distributions of communication channel capacities in a case of M=N=4.

FIG. 5 shows the results of a simulation test that is different from the simulation test of FIG. 4 in that both M and N are 4. More specifically, the distributions and the cumulative distributions of communication channel capacities based on four eigenvalues $\lambda_1$, $\lambda_2$, $\lambda_3$, and $\lambda_4$ ($\lambda_1 \square \lambda_2 \square \lambda_3 \square \lambda_4$) are examined to obtain curves MIMOch1 through MIMOch4. Further, the distributions and the cumulative distributions of communication channel capacities based on the average value of the eigenvalues and the total value of the eigenvalues are examined to obtain a curve MIMO$_{average}$ and a curve MIMO$_{total}$, respectively. Also, a curve MIMO$_{average\ total}$ is obtained by quadrupling the communication channel capacity based on the average value $\lambda_{ave}$. For comparison purposes, a curve obtained in a case of a SISO system is also shown. As can be seen from FIG. 5, the cumulative distribution curves are arranged in accordance with the relationship among the eigenvalues $\lambda_1$, $\lambda_2$, $\lambda_3$, and $\lambda_4$.

Figure 6:
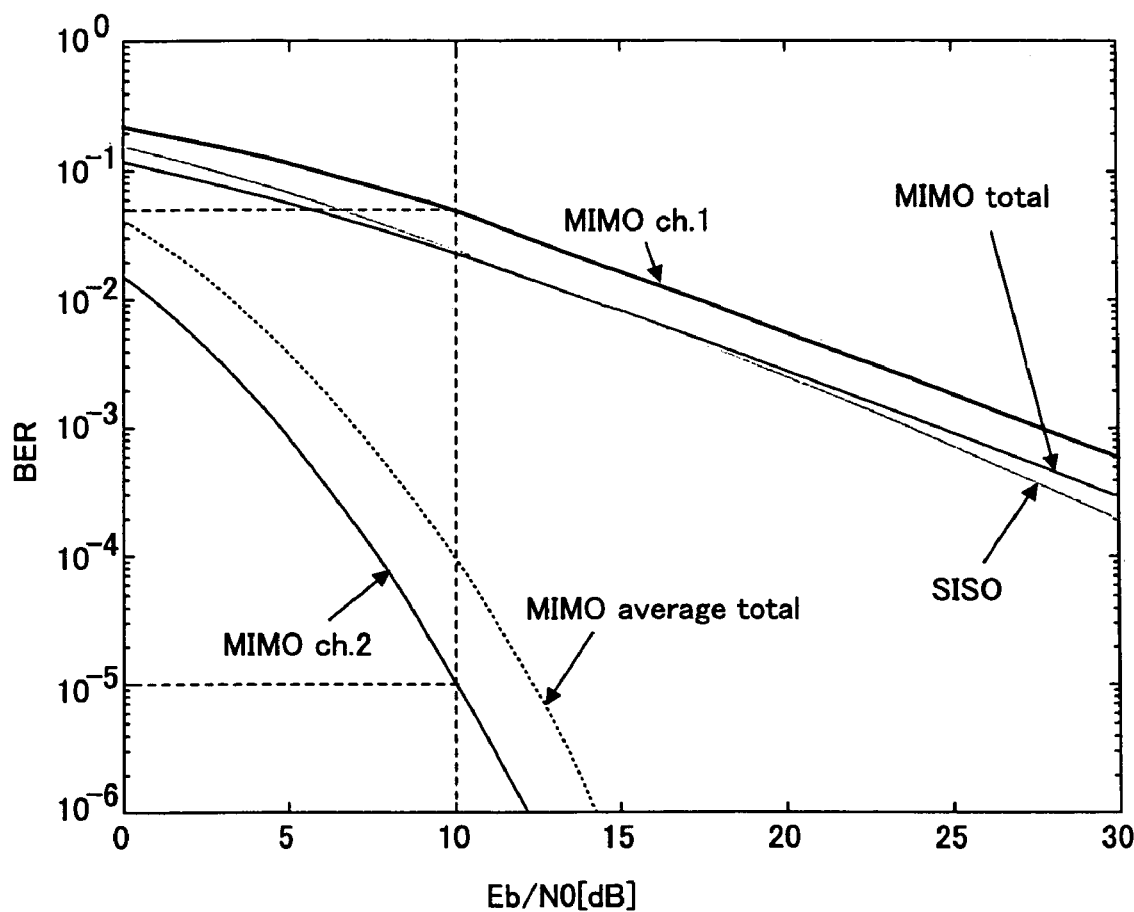
FIG. 6 is a graph of the results of a simulation test conducted to examine the bit error rates with respect to communication channel capacities in a case of M=N=2.

FIG. 6 shows the results of a simulation test that was conducted on the bit error rates (BER) obtained when BPSK-modulated signals were transmitted through the communication channels corresponding to the eigenvalues of a matrix HH*. In this test, the values M and N are both 2. A curve MIMOch2 is obtained by examining the bit error rate in the communication channel with respect to the smaller eigenvalue $\lambda_2$, and a curve MIMOch1 is obtained by examining the bit error rate in the communication channel with respect to the larger eigenvalue $\lambda_1$. A curve MIMO$_{ave}$ and a curve MIMO$_{total}$ are obtained by examining the bit error rates in the communication channels with respect to the average value and the total value of the eigenvalues. Also, a curve MIMO$_{average\ total}$ is obtained by examining the bit error rate with the total communication channel capacity based on the average value $\lambda_{ave}$. Further, a curve that is obtained in a case of a SISO system is also shown for comparison purposes.

As can be seen from FIG. 6, the bit error rate in the communication channel with respect to the larger eigenvalue $\lambda_1$ is low, and the bit error rate in the communication path with respect to the eigenvalue $\lambda_2$ is high. In other words, the larger eigenvalue $\lambda_1$ provides a desirable communication channel, but the smaller eigenvalue $\lambda_2$ does not provide a desirable communication channel. In a case where Eb/N$_o$ is 10 dB, for example, the bit error rate (MIMOch1) in the communication channel with respect to the larger eigenvalue is approximately $10^{-5}$, but the bit error rate (MIMOch2) in the communication channel with respect to the smaller eigenvalue is higher than $10^{-2}$.

Figure 7:
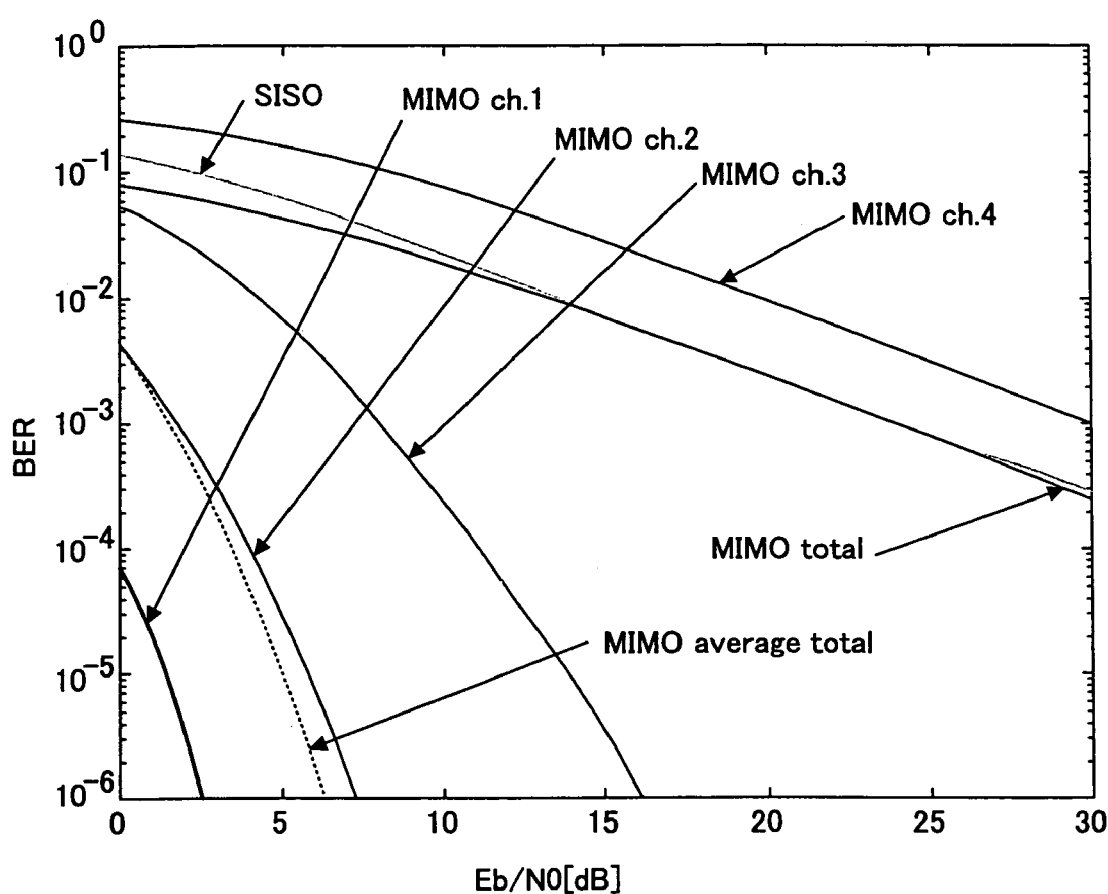
FIG. 7 is a graph of the results of a simulation test conducted to examine the bit error rates with respect to communication channel capacities in a case of M=N=4.

FIG. 7 also shows the results of a simulation test that was conducted on the bit error rates (BER) obtained when BPSK-modulated signals were transmitted through the communication channels corresponding to the eigenvalues of a matrix HH*. In this test, the values M and N are both assumed to be 4. The bit error rates in the communication channels with respect to four eigenvalues $\lambda_1$, $\lambda_2$, $\lambda_3$, and $\lambda_4$ ($\lambda_1 \square \lambda_2 \square \lambda_3 \square \lambda_4$) are examined to obtain curves MIMOch1 through MIMOch4. The bit error rates in the communication channels with respect to the average value of the eigenvalues and the total value of the eigenvalues are examined to obtain a curve MIMO$_{average}$ and a curve MIMO$_{total}$. Also, a curve MIMO$_{average\ total}$ is obtained by examining the bit error rate with the total communication channel capacity based on the average value $\lambda_{ave}$. Further, a curve obtained in a case of a SISO system is shown for comparison purposes.

As can be seen from FIG. 7, the bit error rate curves are arranged in accordance with the relationship among the eigenvalues $\lambda_1$, $\lambda_2$, $\lambda_3$, and $\lambda_4$. Accordingly, a larger eigenvalue provides a desirable communication channel, but a smaller eigenvalue does not provide a desirable communication channel. Especially, the bit error rate in the communication channel with respect to the smallest eigenvalue $\lambda_4$ is higher than the bit error rate in the case of a SISO system.

As described above, the communication channel capacities and the bit error rates calculated based on eigenvalues and the cumulative distributions of the eigenvalues reveal that a communication channel with respect to a small eigenvalue cannot be a better communication channel than that of a SISO system in terms of the throughput and bit error rate. As a result, the entire communication channel capacity $C_{all}$ might decrease. In a case where the communication channel capacity with respect to the larger eigenvalue $\lambda_1$ is represented by $C_{large}$, and the communication channel capacity with respect to the smaller eigenvalue $\lambda_2$ is represented by $C_{small}$, with M and N being 2, the entire communication channel capacity $C_{all}$ is expressed by:

$$C_{all} = C_{large} + C_{small}$$

If the communication channel capacity $C_{small}$ with respect to the smaller eigenvalue $\lambda_2$ cannot be put into practical use, the entire communication channel capacity $C_{all}$ decreases accordingly.

The present invention is aimed at restricting generation of such small eigenvalues and effectively utilizing the entire communication channel capacity. In accordance with the present invention, the matrix elements of the matrix HH*, that is, the matrix elements $h_{ij}$ of the communication channel matrix H, are controlled so that the eigenvalues to be obtained vary only in a very small range. More specifically, the eigenvalues of HH* are first calculated based on the current channel matrix H, and the average value $\lambda_{ave}$ of the eigenvalues is then calculated. The matrix elements $h_{ij}'$ of such a matrix (H')(H')* as to provide the same eigenvalue as the average value $\lambda_{ave}$ is inversely calculated. In other words, the matrix elements $h_{ij}'$ of a channel matrix H' are inversely calculated. The antenna directivity is then controlled so that the current channel matrix H approaches the inversely calculated channel matrix H'. As a result, the eigenvalue variation becomes narrower in the communication channels based on the updated channel matrix. The smallest eigenvalue variation can be obtained when all the eigenvalues are equal to the average value $\lambda_{ave}$. If such a communication environment is realized, the communication channel capacities can be more efficiently utilized.

In a case where the communication channel capacity with respect to the eigenvalue $\lambda_{ave}$ is represented by $C_{ave}$, with M and N being 2, the entire communication channel capacity $C_{all}$ is expressed by:

$$C_{all} = 2C_{ave}$$

The communication channel capacity based on the average value $\lambda_{ave}$ of the eigenvalues is represented by the curves MIMO$_{average}$ shown in FIGS. 4 and 5, and the entire capacity is represented by the curves MIMO$_{average\ total}$. In the example shown in FIG. 4, each of the two communication channels provides the capacity represented by the curve MIMO$_{average}$. In the example shown in FIG. 5, each of the four communication channels provides the capacity represented by the curve MIMO$_{average}$. The entire communication channel capacity calculated by multiplying the average-value communication channel capacity by the number of ranks is greater than the sum of the communication channel capacities based on the respective eigenvalues. Furthermore, the communication channel capacity (MIMO$_{average}$) based on the average value provides a more preferable communication path than a SISO system. More specifically, if the matrix elements of the channel matrix H are adjusted so that the eigenvalues of HH* become equal to the average value of the eigenvalues, the probability of the communication channel capacity with respect to the adjusted matrix becoming smaller than that of a SISO system is greatly reduced. Furthermore, as shown in FIGS. 6 and 7, the bit error rate (the curve MIMO$_{average}$) of the communication channel based on the average value $\lambda_{ave}$ of the eigenvalues is much lower than the bit error rate (the curve MIMO$_{total}$) of a case in which the eigenvalues vary greatly.

If the variation of eigenvalues is restricted in the above manner, the variation of the corresponding communication channel capacities is also narrowed, and the bit error rate is lowered. Accordingly, the entire communication channel capacity can be efficiently utilized. It should be obvious to those skilled in the art that the above tendency can be observed not only in cases where M and N are 2 or 4, but also in cases where M and N are any other integers.

The following is a description of embodiments of the present invention, with reference to the accompanying drawings.

Figure 8:
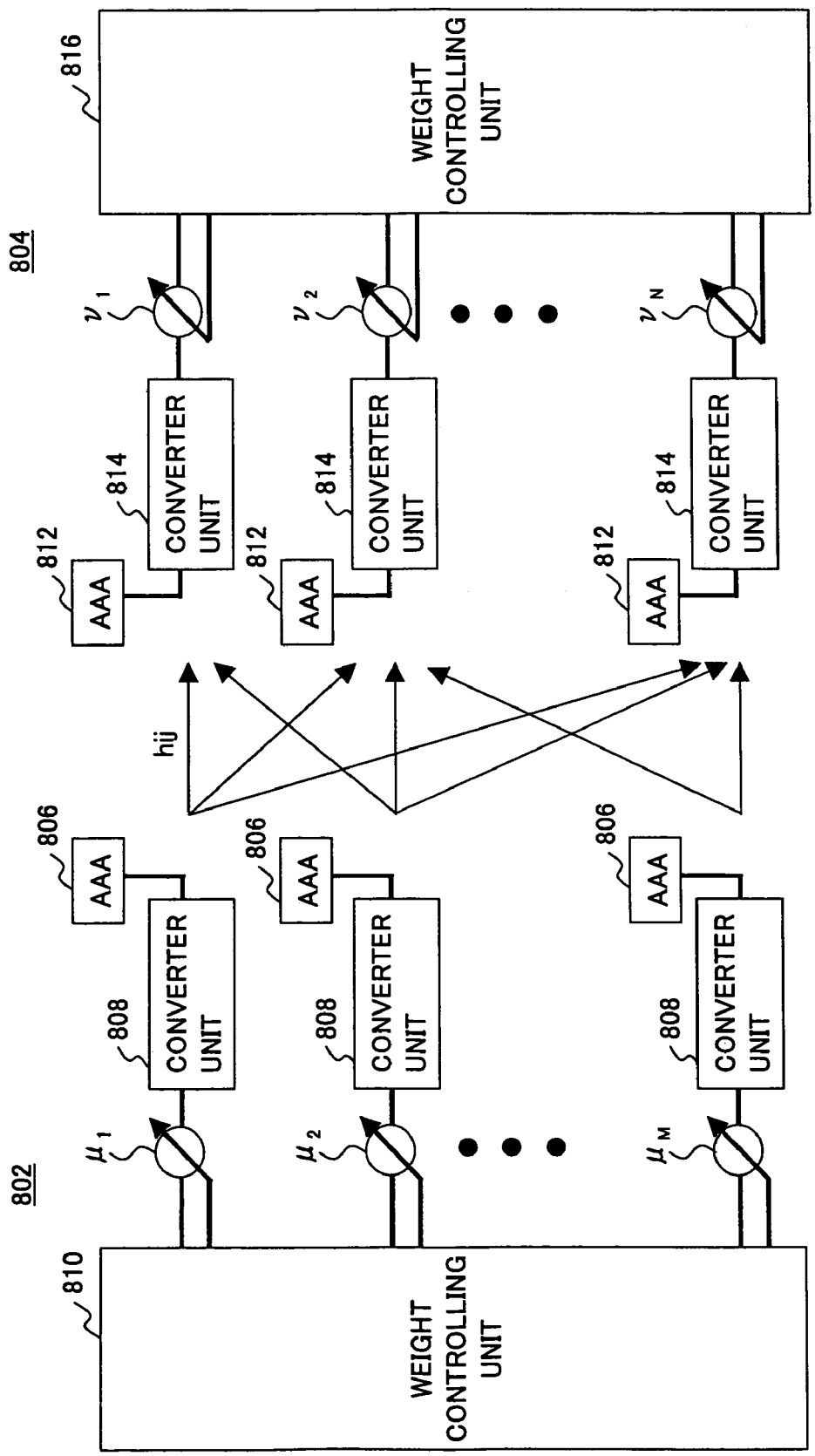
FIG. 8 is a schematic diagram illustrating wireless communication apparatuses that are employed in a MIMO wireless communication system in accordance with the present invention.

FIG. 8 illustrates wireless communication apparatuses 802 and 804 that are employed in a MIMO wireless communication system in accordance with the present invention. The wireless communication apparatus 802 includes M antenna units 806 that transmit and receive radio frequency signals. Here, M is an integer of 2 or greater. In this embodiment, each antenna of the antenna units 806 is used both for transmission and reception, utilizing a switch for alternative modes or a frequency sharing device (not shown). However, in other embodiments, antenna units may be provided especially for transmission, while the other antenna units are provided especially for reception. Also, other elements may accompany the antenna units. In this embodiment, each of the M antenna units 806 is formed by an adaptive array antenna that can control directivity. In other embodiments, however, some of the M antenna units 806 may be formed by adaptive array antennas, and each of the other antenna units 806 may be formed by a feeder antenna. As is described below, matrix elements $h_{ij}$ determine which one(s) of antenna units 806 should be an adaptive array antenna.

The wireless communication apparatus 802 also includes converter units 808 corresponding to the M antenna units 806. The converter units 808 convert analog signals supplied from the antenna units 806 into digital signals for a weight controlling unit (described later), and vice versa. At a time of transmission, each of the converter units 808 functions as a digital-analog converter. At a time of reception, each of the converter units 808 functions as an analog-digital converter. In a case where transmission channels are provided separately from reception channels, however, digital-analog converter units may be provided separately from analog-digital converter units.

The wireless communication apparatus 802 also includes a weight controlling unit 810 that controls the weights with respect to the M antenna units 806. The wireless communication apparatus 802 can allocate a suitable weight µj to each digital signal to be input to converter units 808 and each digital signal output from the converter units 808. Here, j is an integer between 1 and M.

For ease of explanation, the wireless communication apparatuses 802 and 804 of this embodiment have the same structures, and therefore, the wireless communication apparatus 804 is not described in detail. The wireless communication apparatus 804 includes N antenna units 812 each connected to a converter unit 814. Here, N is an integer of 2 or greater, and is either the same as M or different from M. Each digital signal to be input to and output from the converter units 814 is given a weight $v_i$ by a weight controlling unit 816. Here, i is an integer between 1 and N.

Figure 9:
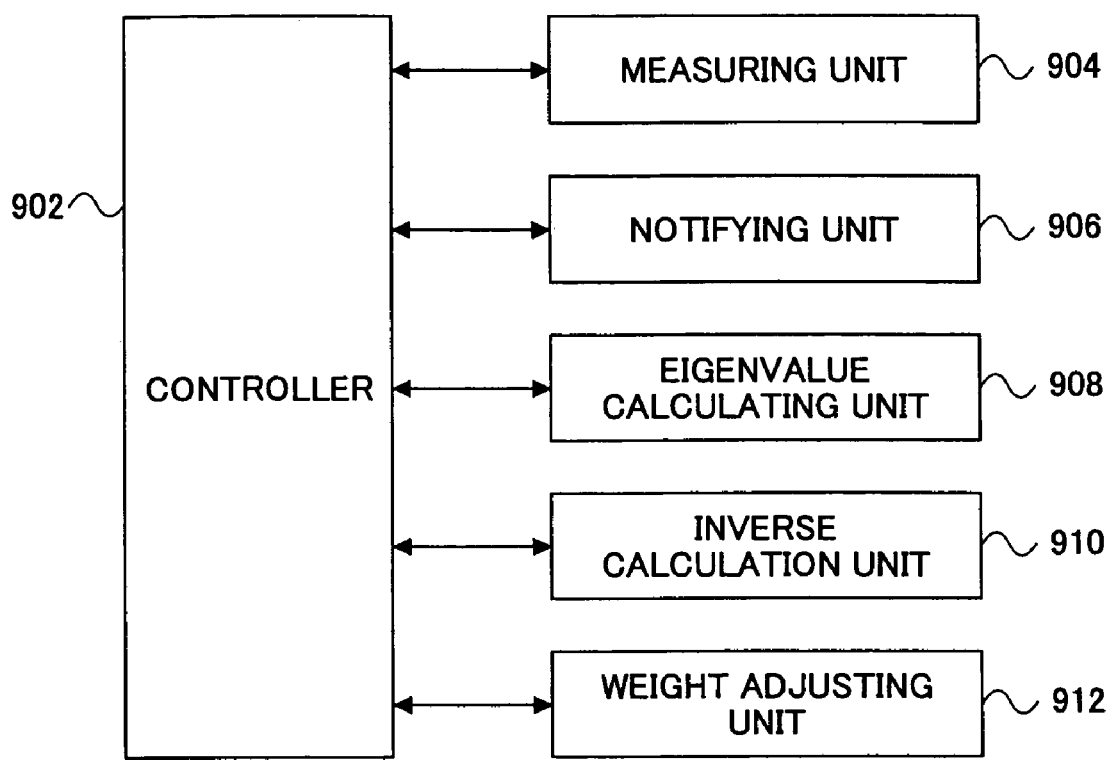
FIG. 9 is a functional block diagram of each of the weight controlling units of the wireless communication apparatuses shown in FIG. 8.

FIG. 9 is a functional block diagram of the weight controlling units 810 and 816. Each of the weight controlling units 810 and 816 includes a controller 902 that controls the operation of each of the following components: a measuring unit 904 that measures each signal supplied from the antenna units; a notifying unit 906 that notifies the other end in communication of channel matrix information; an eigenvalue calculating unit 908 that calculates the eigenvalues of a matrix HH*, or the like; an inverse calculation unit 910 that calculates a channel matrix H' after updating; and a weight adjusting unit 912 that controls the directivity of the adaptive array antenna. The directivity control may be performed through beam-forming for steering main beams toward desired waves, or through null-steering for steering nulls toward interferers, or through an operation that combines the above two operations. In any way, the directivity should be adjusted so that the signal-to-interference-plus-noise ratio increases to the maximum.

The operations are next described. In this embodiment, the wireless communication apparatus 802 is at the reception end, and the wireless communication apparatus 804 is at the transmission end, for ease of explanation. However, it is of course possible to switch the sides. First, the wireless communication apparatus 802 performs front-end operations such as frequency conversion and band limitation on each radio frequency signal supplied from the antenna units 806. The converter units 808 convert analog signals into digital signals, and the digital signals are suitably weighted. The weighted digital signals are then introduced into the weight controlling unit 810. It should be noted that the components used for the front-end operations are not shown in the drawing. The weight controlling unit 810 measures each received signal, so as to determine the matrix elements $h_{ij}$ of the current channel matrix H. Here, i represents an integer between 1 and N, and j represents an integer between 1 and M. The matrix element information obtained through the measurement is then sent to the other end of communication, such as the wireless communication apparatus 804, via a wireless channel. The signal processing for the notification is performed by the notifying unit 906 under the control of the controller 902. Through the notification, the wireless communication apparatuses 802 and 804 on the transmission and reception ends can share the knowledge with respect to the current channel matrix H. Although the measuring unit 904 and the notifying unit 906 are not necessarily required in all wireless communication apparatuses, every wireless communication apparatus should at least be capable of utilizing the information of the current channel matrix H.

Based on the measured or sent current channel matrix H, the weight controlling unit 810 calculates the eigenvalues $\lambda_i$ of the HH* (i being an integer between 1 and r, and r representing the number of ranks of the matrix HH*), the total value of the eigenvalues, and the average value $\lambda_{ave}$ of the eigenvalues. These operations are performed by the eigenvalue calculating unit 908. As the M antenna units 806 and the N antenna units 812 exist in this embodiment, the channel matrix H is a matrix of M by N, and the matrix HH* is a square matrix of N by N. Accordingly, N eigenvalues $\lambda_i$ are normally obtained ($\lambda_1 \square \ldots \square \lambda_N$).

The weight controlling unit 810 then inversely calculates such a channel matrix $H_{ave}$ that all the eigenvalues become equal to the average value $\lambda_{ave}$, using the average value $\lambda_{ave}$ in the inverse calculation. In other words, the channel matrix $H_{ave}$ is determined so that all the eigenvalues of a matrix $(H_{ave})(H_{ave})^*$ become equal to the average value $\lambda_{ave}$. This operation is performed by the inverse calculation unit 910.

The weight controlling unit 810 then controls the adaptive array antenna directivity of the antenna units 806, so that the current channel matrix H approaches the inversely calculated channel matrix $H_{ave}$. This operation is performed by the weight adjusting unit 912. There are various techniques for adjusting the contents of a channel matrix. For example, the matrix elements $h_{ij}$ can be made larger in the following manner. First, code sequences $C_1$ through $C_M$ that vertically cross one another are allocated in advance to the M antenna units 806 of the wireless communication apparatus 802. Likewise, code sequences $D_1$ through $D_N$ that vertically cross one another are allocated in advance to the N antenna units 812 of the wireless communication apparatus 804. These code sequences are known to both the transmission end and the reception end. The jth antenna unit 812 of the wireless communication apparatus 804 steers the main beams in the incoming direction of the code sequence $C_j$, and the ith antenna unit 806 of the wireless communication apparatus 802 steers the main beams in the incoming direction of the code sequence $D_i$. By doing so at both ends, the matrix elements $h_{ij}$ can be adjusted. Since the code sequences vertically cross one another, the matrix elements can be distinguished from one another. On the other hand, if nulls are steered, instead of main beams, the matrix elements $h_{ij}$ can be made smaller. The directivity control may be performed either independently of or in conjunction with the weights $\mu_j$ and $v_i$ given to the antenna units 806 and 812.

In this embodiment, all the M antenna units 806 and the N antenna units 812 are formed by adaptive array antennas, and the directivity of each of the antenna units 806 and 812 can be adjusted separately from the others. Accordingly, all the matrix elements $h_{ij}$ can be adjusted. In this aspect, the wireless communication apparatuses 802 and 804 greatly differ from a conventional MIMO wireless communication apparatus in which antenna units are formed by individual antenna elements, instead of adaptive array antennas. Also, in a case where a part of the matrix elements $h_{ij}$ is to be adjusted, it is possible to employ an adaptive array antenna for a part of the antenna units.

In this embodiment, the matrix calculated by the inverse calculation unit 910 has eigenvalues that are all equal to the average value $\lambda_{ave}$. As described above, in such a communication environment, the eigenvalues do not vary, all the communication channels have the same communication channel capacity $C_{ave}$, and the entire communication channel capacity $C_{all}$ can be effectively utilized. In accordance with the present invention, a great effect can be obtained by narrowing the variation of the eigenvalues, not to mention by eliminating the variation of the eigenvalues. As long as an extremely small eigenvalue is not generated, or as long as a communication channel with an extremely poor throughput and an extremely high bit error rate is not generated, the entire communication channel capacity $C_{all}$ can be used in actual communications. Therefore, the inverse calculation unit 910 advantageously calculates the matrix H' so that the eigenvalues of $(H')(H')^*$ fall within a predetermined range that includes the average value $\lambda_{ave}$ but does not include the smallest eigenvalue $\lambda_{min}$. It is also possible to set such a range that does not include the smallest eigenvalue and the largest eigenvalue but does include the average value $\lambda_{ave}$. In either way, the eigenvalue variation of the newly calculated matrix $(H')(H')^*$ should be made narrower than the eigenvalue variation of the current matrix HH*.

The adaptive array antennas that can be employed for the antenna units 806 and 812 of this embodiment may be of any type that can feed analog signals to the converter units 808 and 814, and receive analog signals from the converter units 808 and 814. It is therefore possible to employ adaptive array antennas of a spatial composition type or a phased array type for the antenna units 806 and 812.

FIG. 10 illustrates an adaptive array antenna 1000 of the spatial composition type that can be employed for the antenna units 806 and 812. As shown in FIG. 10, the adaptive array antenna 1000 includes a feeder antenna element 1002 that is connected to the converter units 808 and 814 shown in FIG. 8, and non-feeder antenna elements 1004. For ease of explanation, the components to be used for front-end operations such as frequency conversion and band limitation are not shown in FIG. 10. The antenna elements are arranged at a distance shorter than a half-wave length from one another, so that the spatial correlation among the antenna elements can be great. Each of the non-feeder antenna elements 1004 is connected to a ground potential via a variable reactance circuit unit 1006 that can vary the reactance in accordance with control signals. Each control signal for the variable reactance circuit unit 1006 is adaptively controlled by a variable reactance controlling circuit unit 1008. This variable reactance controlling circuit unit 1008 may be provided in the weight controlling units 810 and 816, or may be provided independently. Each control signal may be generated in conjunction with the weights $\mu_j$ and $v_i$ given to the antenna units 806 and 812, or may be generated independently.

With such an adaptive array antenna of the spatial composition type, the number of elements to be controlled can be reduced (each one of the variable reactance circuit units 1006 can be formed by one capacitor, for example). Thus, the matrix elements $h_{ij}$ of a channel matrix can be readily adjusted.

FIG. 11 illustrates an adaptive array antenna 1100 of the phased array type that can be employed for the antenna units 806 and 812. As shown in FIG. 11, the adaptive array antenna 1100 includes feeder antennas 1102, and radio frequency weighting circuit units 1104 that weight signals supplied from the feeder antennas 1102 in accordance with control signals. The radio frequency weighting circuit units 1104 adjust the phase of each signal (in some special cases, the amplitude as well as the phase of each signal can be adjusted). Each output from the radio frequency weighting circuit units 1104 is supplied to a radio frequency compounding circuit unit 1106 that outputs a composite analog signal to the converter units 808 and 814. The composite analog signal is also supplied to a radio frequency weight controlling circuit 1108 that controls weights to be added to the feeder antenna elements. This radio frequency weight controlling unit 1108 may be provided in the weight controlling units 810 and 816 or may be provided independently. Further, each control signal may be generated in conjunction with the weights $\mu_j$ and $v_i$ given to the antenna units 806 and 812, or may be generated independently.

With such an adaptive array antenna of the phased array type, phases can be arbitrarily adjusted by the radio frequency weight controlling circuit units 1104, and accordingly, a greater degree of freedom can be allowed for the adjusting operation. Thus, the matrix elements $h_{ij}$ of a channel matrix can be minutely adjusted.

FIG. 12 illustrates a case where polarized wave sharing antennas are employed as antenna elements. In this structure, radio frequency weighting circuit unit 1206 and 1208 are provided for polarized wave sharing antennas 1202 and 1204, respectively. The radio frequency weighting circuit units 1206 and 1208 weight signals in accordance with control signals, and supply the weighted signals to a radio frequency compounding circuit unit 1210 that compounds the weighted signals. The composite signal is then supplied from the radio frequency compounding circuit unit 1210 to the converter units 808 and 814 as well as a radio frequency weight controlling circuit unit 1212 that generates control signals.

With such a structure, the channel matrix elements $h_{ij}$ can be more minutely adjusted, because the polarization characteristics of radio signals, as well as the amplitudes and phases, can be taken into consideration.

As described so far, at least one adaptive array antenna is employed for the antenna units used in a MIMO wireless communication apparatus of this embodiment. The weight controlling unit of the wireless communication apparatus calculates such a channel matrix that narrows the eigenvalue variation. The adaptive array antenna directivity is then controlled in such a manner that the current channel matrix approaches the calculated channel matrix. After the eigenvalue variation is narrowed (ideally, all the eigenvalues become equal to the average value $\lambda_{ave}$, and accordingly, the eigenvalue variation is eliminated), the variation of communication channel capacities corresponding to the eigenvalues is also narrowed. As a result, the communication channel capacities corresponding to all the eigenvalues can be effectively utilized in actual communications.

It should be noted that the present invention is not limited to the embodiments specifically disclosed above, but other variations and modifications may be made without departing from the scope of the present invention.

This patent application is based on Japanese Priority Patent Application No. 2003-200446, filed on Jul. 23, 2003, the entire contents of which are hereby incorporated by reference.

What is claimed is:

1. A wireless communication apparatus that is employed in a multiple-input-multiple-output wireless communication system, comprising:

a plurality of antenna units that transmit or receive a radio frequency signal; and a weight controlling unit that gives a weight with respect to each of the plurality of antenna units, wherein each of the plurality of antenna units is formed by an adaptive array antenna unit, and the adaptive array antenna unit of each antenna unit comprises a plurality of antenna elements and has a directivity that is changed by varying weights with respect to the plurality of antenna elements, and wherein the weight controlling unit comprises:

an eigenvalue calculating unit that calculates eigenvalues of a matrix represented by the product of a current channel matrix representing the transmission characteristics of wireless transmission channels of the respective antenna units and a conjugate transposed matrix of the current channel matrix; and an inverse calculation unit that calculates such a channel matrix as to have all eigenvalues within a predetermined range that includes the average value of the calculated eigenvalues but does not include the smallest one of the calculated eigenvalues.

2. The wireless communication apparatus as claimed in claim 1 wherein the weight controlling unit further comprises:

a directivity adjusting unit that adjusts the directivity of the adaptive array antenna unit, so that the current channel matrix approaches the channel matrix calculated by the inverse calculation unit.

3. The wireless communication apparatus as claimed in claim 2 wherein the predetermined range does not include the largest value and the smallest value among the calculated eigenvalues.

4. The wireless communication apparatus as claimed in claim 2 wherein the inverse calculation unit calculates such a channel matrix that all eigenvalues become equal to the average value.

5. The wireless communication apparatus as claimed in claim 1 further comprising a plurality of converter units that are provided for the plurality of antenna units, each converting a digital signal into an analog signal and vice versa, wherein the weight controlling unit adds a weight to each signal to be input to or output from the converter units.

6. The wireless communication apparatus as claimed in claim 1 wherein the adaptive array antenna unit includes a plurality of feeder antennas that are the antenna elements, and a compounding unit tat compounds signals supplied from the feeder antennas, and
wherein the directivity is adjusted by changing the relative amplitude or phase of each of the radio frequency signals wit respect to the feeder antennas.

7. The wireless communication apparatus as claimed in claim 1 wherein the antenna elements of the adaptive array antenna unit include a feeder antenna and a plurality of non-feeder antennas, and the directivity is adjusted by changing a variable reactance value that is given to each of the non-feeder antennas.

8. The wireless communication apparatus as claimed in claim 1 wherein the antenna elements of the adaptive array antenna unit are polarized wave sharing antennas.

9. The wireless communication apparatus as claimed in claim 1 wherein the weight controlling unit adaptively controls the directivity so as to steer a main lobe toward a desired signal.

10. The wireless communication apparatus as claimed in claim 1 wherein the weight controlling unit adaptively controls the directivity so as to steer a null toward an interferer.

11. The wireless communication apparatus as claimed in claim 1 further comprising a channel matrix calculating unit tat measures one of the received radio frequency signals so as to calculate a current channel matrix.

12. The wireless communication apparatus as claimed in claim 11 wherein the channel matrix calculating unit utilizes code sequences that are allocated in advance to the antenna units, so as to distinguish matrix elements of the channel matrix from one another, the code sequences vertically crossing one another.

13. A multiple-input-multiple-output wireless communication system comprising a wireless transmission apparatus and a wireless reception apparatus, at least one of the wireless transmission apparatus and the wireless reception apparatus comprising:
a plurality of antenna units that transmit or receive a radio frequency signal; and
a weight controlling unit that gives a weight with respect to each of the plurality of antenna units,
wherein each of the plurality of antenna units is formed by an adaptive array antenna unit, and the adaptive array antenna unit of each antenna unit comprises a plurality of antenna elements and has a directivity that is changed by varying weights with respect to the plurality of antenna elements, and
wherein the weight controlling unit comprises:
an eigenvalue calculating unit that calculates eigenvalues of a matrix represented by the product of a current channel matrix representing the transmission characteristics of wireless transmission channels of the respective antenna units and a conjugate transposed matrix of the current channel matrix; and
an inverse calculation unit that calculates such a channel matrix as to have all eigenvalues within a predetermined range that includes the average value of the calculated eigenvalues but does not include the smallest one of the calculated eigenvalues.

14. The multiple-input-multiple-output wireless communication system as claimed in claim 13 wherein a current channel matrix is known to both the wireless transmission apparatus and the wireless reception apparatus.

15. The multiple-input-multiple-output wireless communication system as claimed in claim 13 wherein the wireless transmission apparatus is notified of a current channel matrix determined in the wireless reception apparatus.

* * * * *